Patented Aug. 28, 1923.

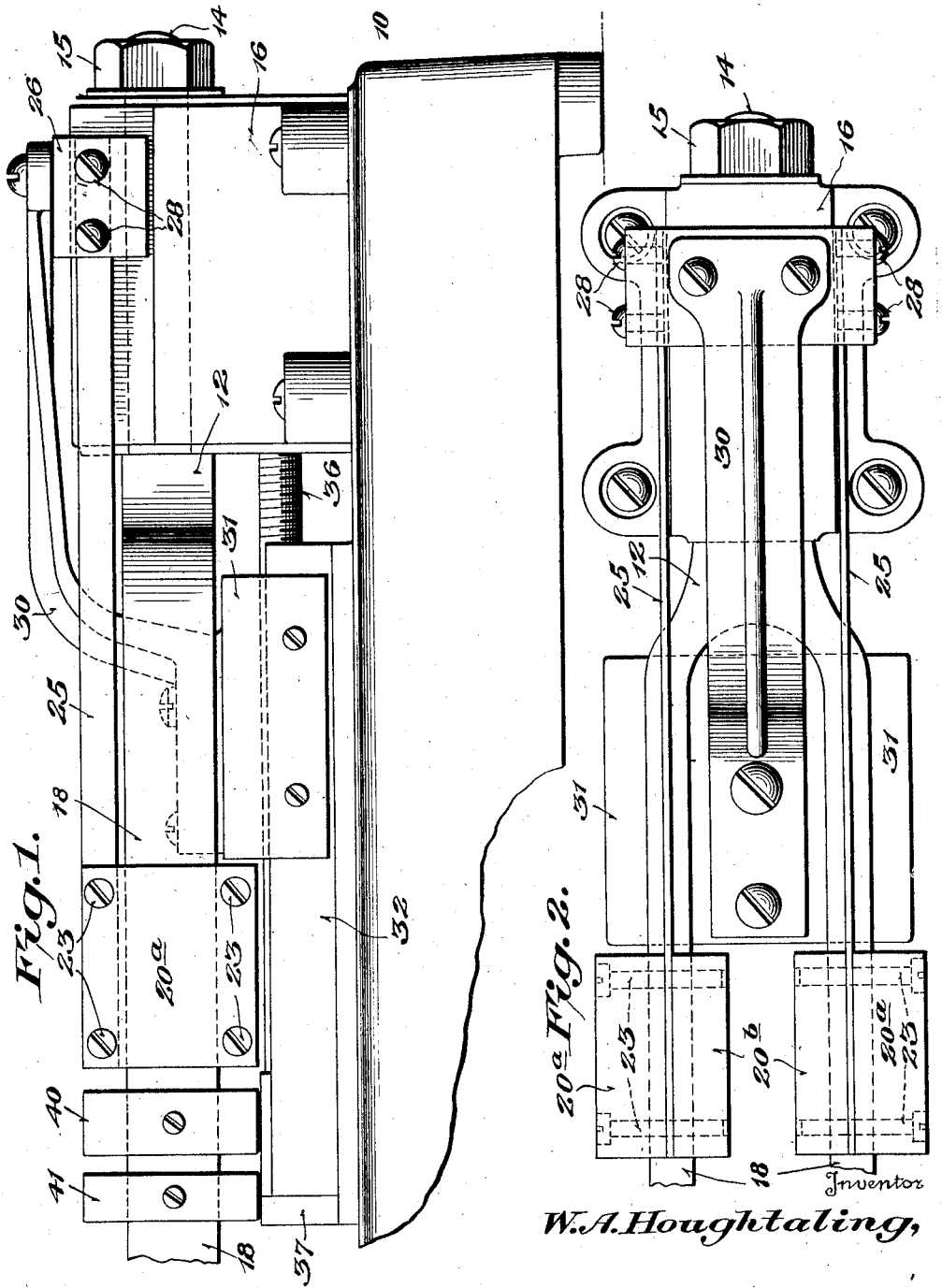

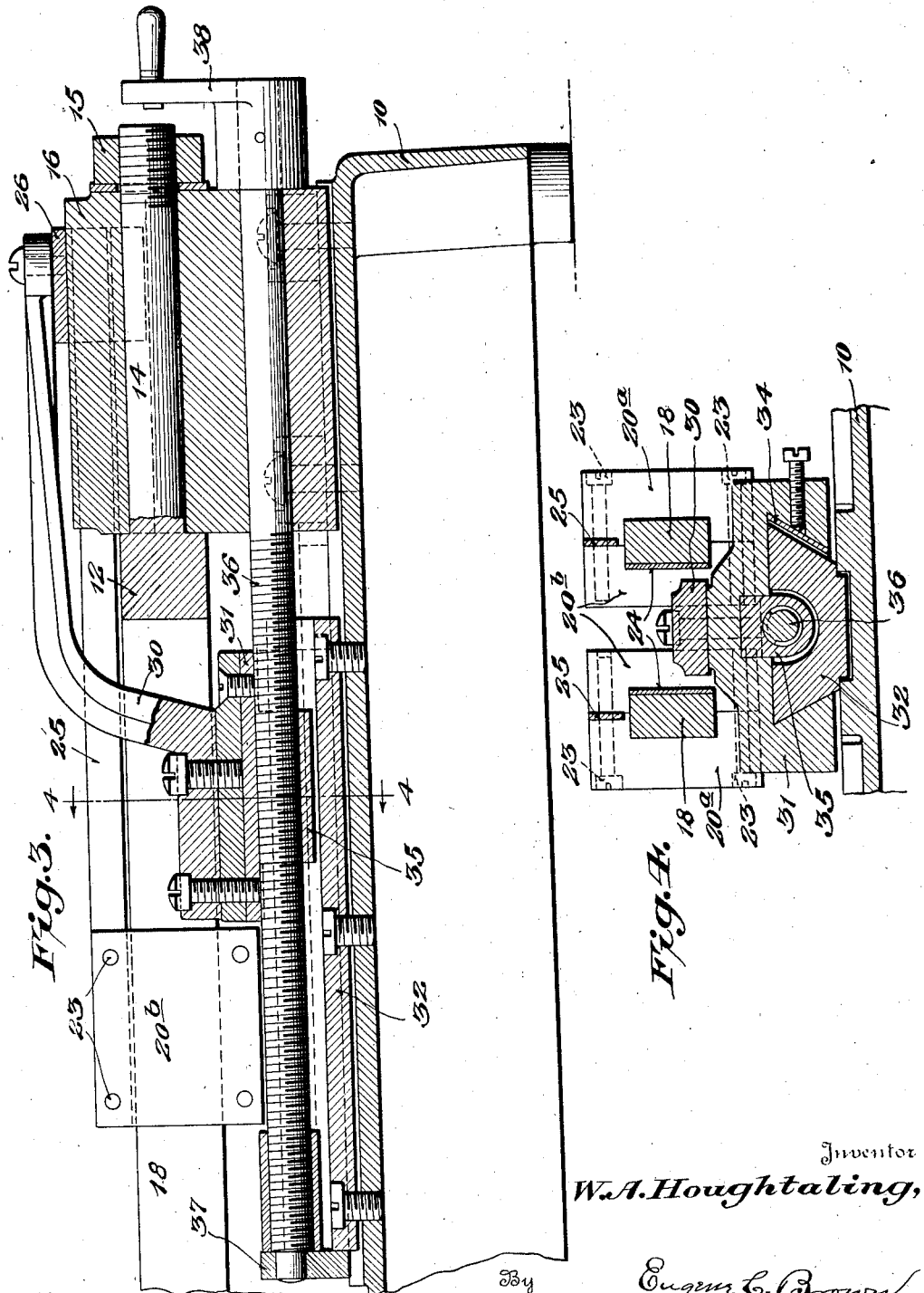

1,466,623

UNITED STATES PATENT OFFICE.

WALTER A. HOUGHTALING, OF DUNELLEN, NEW JERSEY, ASSIGNOR TO THE WESTERN UNION TELEGRAPH COMPANY, OF NEW YORK, N. Y., A CORPORATION OF NEW YORK.

ADJUSTABLE-VIBRATION TUNING FORK.

Application filed January 13, 1922. Serial No. 528,980.

*To all whom it may concern:*

Be it known that I, WALTER A. HOUGHTALING, a citizen of the United States, residing at Dunellen, in the county of Middlesex and State of New Jersey, have invented certain new and useful Improvements in Adjustable-Vibration Tuning Forks, of which the following is a specification.

This invention relates to tuning forks having means for readily changing the rate of vibration of the tines without arresting their vibratory action.

That the period of vibration of tuning forks may be altered by changing the length of the tines or by varying the distribution of their weight is well known and various arrangements have been employed for this purpose. The most common expedient is to provide the tines with adjustable weights which may be moved simultaneously along their length. One device for accomplishing this purpose which has been used heretofore consists of a slidable block adjustable lengthwise of the fork and is connected to the weights by means of links. This construction has the objectional feature of requiring a loose or pivotal connection at each end of the links, i. e. between the link and the weight and between the block and the link. My invention eliminates the loose or pivotal connections in the link members without interfering with the natural vibration of the tines.

In the following description I shall refer to the accompanying drawings, in which—

Figure 1 is a side elevation of an adjustable tuning fork embodying my invention; Fig. 2 is a top plan view and Fig. 3 is a central longitudinal sectional view of the same; and Fig. 4 is a transverse sectional view on the line 4—4 of Fig. 3.

The tuning fork is mounted in a horizontal position upon a base 10, the yoke 12 being extended into a stem 14 which is threaded upon its outer end to receive a nut 15 to secure it rigidly to a standard 16, bolted to the base. The adjustable weights which are slidably carried by the tines 18, are preferably composed of mating members 20ª, 20ᵇ, recessed to receive the tines and secured together by screws 23. A spring 24 within the recess in each block, presses against the inside face of the tine to prevent the weight from rattling.

For the purpose of adjusting the weights to different positions along the tines each weight is connected by a long, thin, straight, flexible leaf spring strip 25 to a cross-head 26, mounted to reciprocate upon the standard 16. The spring is tightly clamped between the upper portions of the weight members 20ª, 20ᵇ, a recess being accurately machined in one of the members centrally of the tine so that each spring will lie over the longitudinal axis of its tine. The rear ends of the springs are secured by screws 28 to a depending flange or skirt of the cross-head 26. A link 30 connects the cross-head with a block or carriage 31 having a wedge-shaped recess to slide upon a track-member 32 secured to the base. An interposed spring plate 34 prevents any rattling or vibration between these parts. The track 32 is longitudinally grooved to receive a member 35 secured to the block 31 and provided with a female thread to engage a screw 36, rotatably mounted in the standard 16 and a bearing block 37. The screw may be rotated by crank arm 38 or in any other suitable manner to advance or retract the carriage 31 along the track and thereby slide the weights along the tines as desired.

The operation of this apparatus will be understood from the previous description of the structural parts. As is well known, the tines of the fork may be struck to set them in vibration by means of an electro-magnet acting upon each tine. As this is a device well known in the art, it is not necessary to illustrate it or describe it further herein. When it is desired to change the period of vibration without arresting the vibration, the screw 36 is rotated to cause a movement in the proper direction of the block 31 and through the link 30 and spring arms 25, of the weights along the tines. The most minute adjustment can be made instantly with great accuracy. There are no loose connections between the sliding weights, and the cross-head 26, and since the flat spring arms 25 are centrally positioned along the axes of the tines, and may be very thin and flexible, they do not interfere with the natural vibration of the tines.

It is sometimes desirable to provide a number of removable weights which may be initially placed on the tines or removed to secure an approximate distribution of weight along the tines, as I have indicated at 40 and 41.

I claim:—

1. The combination with a tuning fork, of a weight slidably mounted upon each tine, a movable block, long, straight, flexible leaf springs rigidly secured to the weights and operatively connected to said block, and means for moving said block parallel to the axis of the fork.

2. The combination with a tuning fork, of a weight slidably mounted upon each tine, a movable block projecting upon opposite sides of the stem of the tuning fork, straight flexible leaf springs positioned in alinement with the longitudinal axes of the tines and rigidly secured to the weights and operatively connected to said block, and means for moving said block parallel to the axis of the fork.

3. In combination with a tuning fork, a base provided with a standard to which said fork is secured, a weight slidably mounted upon each tine, a cross-head slidably mounted upon said standard, long, straight, flexible leaf springs rigidly secured at opposite ends to said weights and to said cross-head respectively, and means for moving said cross-head.

In testimony whereof I affix my signature.

WALTER A. HOUGHTALING.